(12) United States Patent
Sai et al.

(10) Patent No.: US 7,286,316 B2
(45) Date of Patent: Oct. 23, 2007

(54) METHOD AND DATA STORAGE DEVICE FOR WRITING PATTERNS ONTO RECORDING DISK

(75) Inventors: Fuminori Sai, Kanagawa (JP); Yutaka Ozawa, Kanagawa (JP); Kohji Takasaki, Kanagawa (JP); Hiroshi Yanagisawa, Kanagawa (JP); Satoshi Yamamoto, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/437,552

(22) Filed: May 19, 2006

(65) Prior Publication Data
US 2006/0262449 A1   Nov. 23, 2006

(30) Foreign Application Priority Data
May 20, 2005   (JP)   ............................ 2005-148339

(51) Int. Cl.
*G11B 21/02* (2006.01)
*G11B 5/596* (2006.01)
*G11B 5/55* (2006.01)

(52) U.S. Cl. .................. 360/75; 360/77.08; 360/77.04; 360/78.04

(58) Field of Classification Search ...................... None
See application file for complete search history.

(56) References Cited

U.S. PATENT DOCUMENTS 5,612,833 A    3/1997  Yarmchuk et al.
6,600,621 B1   7/2003  Yarmchuk
7,046,472 B1*  5/2006  Melkote et al. ................ 360/75
2003/0197969 A1* 10/2003 Szita et al. .............. 360/77.08

FOREIGN PATENT DOCUMENTS

JP   08-212733   8/1996

* cited by examiner

*Primary Examiner*—William Korzuch
*Assistant Examiner*—Jason Olson
(74) *Attorney, Agent, or Firm*—Townsend and Townsend and Crew LLP; Patrick Duncan

(57) ABSTRACT

Embodiments of the invention efficiently conduct servo corrections for preventing error propagation during SSW. In an example of the present invention, a servo position signal generator generates a servo position signal indicative of the current position of a read element on the basis of a servo signal from a servo channel. A target position generator generates correction data from multiply and add operations between the PES generated when the track that the read element is following is written, and pre-registered correction coefficients. A correction target position is generated from the correction data and a reference target position, and then output to a position error calculator. The position error calculator generates a position error signal (PES) from the servo position signal and the target position signal, and outputs PES to a servo controller. The servo controller generates a control signal (DACOUT) in accordance with PES, and a motor driver unit supplies an electric current of a required value to a VCM in accordance with the control signal.

19 Claims, 13 Drawing Sheets

//* METHOD AND DATA STORAGE DEVICE FOR WRITING PATTERNS ONTO RECORDING DISK

CROSS-REFERENCES TO RELATED APPLICATIONS

This application claims priority from Japanese Patent Application No. JP2005-148339, filed May 20, 2005, the entire disclosure of which is incorporated herein by reference.

BACKGROUND OF THE INVENTION

The present invention relates to methods for writing patterns onto spinning recording disks, and to data storage devices for executing the same. More particularly, the invention concerns the servo correction process conducted during pattern writing onto a recording disk.

Data storage devices using various types of media such as optical disks and magnetic tapes are known in the art. Among them, hard disk drives (hereinafter referred to as HDDs) have become popular as storage devices for computers to such an extent that they are one type of the storage devices indispensable for today's computers. Further, not limited to computer systems, HDDs are expanding more and more in application because of their excellent characteristics. For example, HDDs are used for movies recording/reproducing devices, car navigation systems, cellular phones, and removable memories for use in digital cameras.

The magnetic disks used in HDDs each have a plurality of concentrically formed tracks, and servo data and user data are stored into each of the tracks. A magnetic head formed of a thin-film element can write or read data by accessing a desired region (address) in accordance with servo data. The signals that the magnetic head has read out from the magnetic disk during a data readout process are subjected to waveform shaping, decoding, and other required signal processing, by a signal-processing circuit, and then transmitted to a host. After undergoing required processing by the signal-processing circuit similarly to the above, transfer data from the host is written onto the magnetic disk.

As described above, each track includes a data region into which data is stored, and a servo pattern region into which servo data is stored. Each servo pattern is composed of a cylinder ID, a sector number, a burst pattern, and other data. The cylinder ID denotes the address of a track, and the servo ID denotes the internal sector address within the track. The burst pattern contains relative position information of the magnetic head with respect to the track.

Servo patterns made up of plural sectors are spaced in a circumferential direction on each track, and the servo patterns of each sector, across all tracks, are the same in circumferential position (i.e., in phase). Data reading out from or writing onto the magnetic disk is executed during rotation of the disk while it is confirming the position of the magnetic head in accordance with servo data.

Servo patterns are written onto magnetic disks in factories before HDDs are shipped as products. Conventional writing of servo patterns typically uses a servo writer as an external device. An HDD with its top cover removed is set in the servo writer, then the servo writer uses a positioner (external positioning mechanism) to precisely position the internal head of the HDD, and the servo patterns that have been generated by a servo pattern generator are written onto the magnetic disk.

Currently, a servo data writing process (Servo Track Write: STW) occupies the substantial portion in the manufacturing costs of HDDs. In recent years, in particular, HDDs have been exposed to intensified competition for higher capacity, and along with this tendency, TPI (Tracks Per Inch) is increasing. As TPI increases, the number of tracks increases and track width decreases. These, in turn, increase an STW time, enhance the precision of servo writers, and result in increased STW costs. Cost reduction of the servo writers, reduction in STW time, and others are being accelerated to reduce those costs.

For example, SSW (Self-Servo Write) uses only the mechanical assembly of an HDD unit to control the internal spindle motor and voice coil motor of the HDD from an external circuit, and uses the external circuit to write servo patterns. This reduces the costs of the servo writer.

An SSW method is known that utilizes the fact that the read element and write element of a head element differ from each other in radial position (this difference is called the read/write offset). In this method, positioning is conducted while the read element reads the servo patterns that have already written on the inside or outside diametral portions of the disk, and the write element writes new servo patterns onto desired tracks distant by the read/write offset.

In self-propagation of the servo patterns thus written onto new tracks, radial accuracy of the servo patterns is expected to be basically inherited to the new servo patterns written without degradation. Because of the factors that cause various errors, however, the accuracy of those patterns is deteriorated by the propagation. A decrease in positioning accuracy causes burst patterns to deviate from where they originally should be, and these deviations are inherited during the next propagation. This process also depends on the coefficient of the servo loop used to make the head element section follow a track. The deterioration of accuracy is of a complex mechanism involving various factors in this way.

In order to prevent the deterioration of track-following accuracy due to such propagation, the following SSW method is proposed in Patent Reference 1 (Japanese Patent Laid-open No. 8-212733). For example, consider a case in which current track TO undergoes track following to write new track TN. A position error signal (PES) by track following during the writing of track TO is stored. A Fourier transform is conducted for the PES, and each resultant frequency components is multiplied by a modification coefficient. This modification coefficient is provided for only high-gain components among all closed-loop response frequency components of the positioning servo of the head element. These high-gain components are usually limited only to several components of low frequencies. Next, an inverse Fourier transform is conducted for each of these components, thus correcting target data associated with each sector during track following to track TO to write patterns at track TN. This suppresses radial propagation errors.

BRIEF SUMMARY OF THE INVENTION

The correction method disclosed in Patent Reference 1 uses four steps during the correction of each sector into target data. A first step is to perform a discrete Fourier transform of PES. A second step is to conduct a multiplication by a coefficient in order to suppress the high-gain components in the Fourier series of the servo closed loop transfer function. A third step is to calculate correction data by conducting discrete inverse Fourier transforms, and a fourth step is to acquire a new target position by adding the correction data to a target reference position. This correction process needs to be performed for each sector during writing onto each track. Repeating the Fourier transform and the inverse Fourier transform for each sector, however, requires very large computing power. Also, although such a process is executable by using a DSP mounted in a dedicated servo writer, it is difficult to perform this task within a short time using the internal circuits mounted in the HDD.

The present invention has been made in view of the above-described problems, and a feature of the invention is to implement efficient servo correction for suppressing cumulative errors in self-writing of patterns onto a recording disk.

A first aspect of the present invention is a method for writing patterns of sectors, in which, on a rotating recording disk, while a read element is following a first track by means of servo control, a write element different in radial position writes patterns of each sector of a second track different from the first track, with patterns of each sector of the first track as reference patterns, the method including the steps of: writing servo patterns of plural sectors of the first track; calculating correction data by multiply and add operations between position errors from a target position of the read element that are associated with each sector during the writing of the first track, and a set of coefficients pre-registered to suppress propagation amplification levels of track position errors due to servo writing at a selected frequency of a servo loop; positioning the read element at each sector of the first track by conducting servo control corrections using the correction data; and with the read element positioned, activating the write element to write the patterns of each sector onto the second track by using the patterns of each sector of the first track as reference patterns.

As described above, correction data is calculated by the multiply and add operations between the position errors from the target position of the read element that are associated with each sector during the writing of the first track, and the set of coefficients pre-registered to suppress the propagation amplification levels of track position errors in servo writing at the selected frequency of the servo loop. Thus, it is possible to efficiently calculate servo control correction data for suppressing cumulative propagation of position error signals and hence to conduct easy servo control corrections even with a processor of small computing power. It is preferable that these servo control corrections be conducted to correct the target position with respect to each sector of the first track by using the correction data.

It is also preferable that the set of coefficients be set in order for the propagation amplification levels of track position errors during servo writing to become less than 1 at all frequencies in the integer multiples of a rotating frequency of the recording disk, which is denoted as fundamental frequency hereafter. This allows cumulative propagation of position error signals to be suppressed more effectively.

In addition, it is preferable that correction data with respect to each sector of the first track be calculated by multiply and add operations between position errors in writing of plural consecutive sectors including the sector, but fewer than the total number of sectors of the first track, and the above set of coefficients. It is thus possible to reduce arithmetic processing required for the correction data calculation while suppressing the accumulation of the position errors due to the pattern propagation. Furthermore, it is preferable that correction data with respect to each sector of the first track be calculated by multiply and add operations between position errors in writing of plural consecutive sectors including the sectors immediately preceding and following the sector, and the above set of coefficients. Alternately, it is preferable that correction data with respect to each sector of the first track be calculated by multiply and add operations between the plural consecutive sectors including a respective definite number of sectors preceding and following the sector, and the above set of coefficients. This allows cumulative propagation of position error signals to be suppressed even more effectively.

It is preferable that the set of coefficients be set in order for the propagation amplification levels of track position errors during servo writing to diminish at plural frequencies in the integer multiples of the fundamental frequency. This allows cumulative propagation of position error signals to be suppressed effectively.

Preferably, the set of coefficients is periodically calculated at each predetermined track and then the calculated set of coefficients is used to execute servo control correction during subsequent pattern writing. Appropriate corrections with respect to different track positions may thus be conducted.

A second aspect of the present invention is a data storage device that writes patterns of tracks onto a recording disk, the data storage device including: the recording disk that rotates; a read element which uses servo control to follow a first track previously written onto the recording disk and including patterns of plural sectors; a write element which differs from the read element in terms of radial position and writes, with each sector of the first track as a reference, the patterns of the tracks onto a second track different from the first track; and a controller which calculates correction data by multiply and add operations between the position errors from a target position of the read element that are associated with each sector during the writing of the first track, and a set of coefficients pre-registered to suppress propagation amplification of track position errors due to servo writing at a selected frequency of a servo loop, wherein the controller, after calculating the correction data, positions the read element on each sector of the first track by conducting servo control corrected using the correction data.

As described above, correction data is calculated by the multiply and add operations between the position errors from the target position of the read element that are associated with each sector during the writing of the first track, and the set of coefficients pre-registered to suppress propagation amplification levels of track position errors in servo writing at the selected frequency of the servo loop. Thus, it is possible to efficiently calculate servo control correction data for suppressing cumulative propagation of position error signals and hence to conduct easy servo control corrections even with a processor of small computing power. The above-mentioned controller may correct servo control by correcting the target position with respect to each sector of the first track by use of the correction data.

It is preferable that the set of coefficients be set in order for the propagation amplification levels of track position errors during servo writing to become less than 1 at all frequencies in the multiples of the fundamental frequency. This allows cumulative propagation of position error signals to be suppressed effectively.

It is also preferable that the controller should calculate the correction data with respect to each sector of the first track by conducting multiply and add operations between position errors in writing of plural consecutive sectors inclusive of the sector, but fewer than the total number of sectors of the first track, and the set of coefficients described above. It is thus possible to suppress the accumulation of propagation of position error signals by more effective arithmetic processing. In addition, it is preferable that the controller should calculate the correction data with respect to each sector of the first track by conducting multiply and add operations between position errors in writing of plural consecutive sectors including the sectors immediately preceding and following the sector, and the above set of coefficients. This allows the accumulation of propagation of position error signals to be suppressed more effectively.

It is preferable that the set of coefficients be set in order for the propagation amplification of track position errors during servo writing to be less than 1 at plural frequencies in the of integer multiples of the fundamental frequency.

Before track following of the first track is conducted, the controller may calculate and register the above set of coefficients by conducting an arithmetic operation equivalent to a matrix product between a Fourier inverse transform, a correction gain matrix, and a Fourier transform.

The controller has an FIR filter and may generate the correction data with respect to each sector by using the set of coefficients as tap weights of the FIR filter and receiving the position errors of the first track that are sequentially input. The correction data may thus be calculated by efficient computing. For efficient computing, it is furthermore preferable that the tap weights be the same with respect to all sectors of the first track by cyclically changing the argument by one unit at each consecutive sector. Alternatively, it is preferable that the FIR filter should have a smaller number of taps than the number of sectors of the first track and that during the calculation of the correction data for each sector, the position errors of the plural consecutive sectors including the sector should be equal to the data obtained from each tap. It is thus possible to suppress the accumulation propagation of position error signals by even more effective arithmetic processing.

According to the present invention, servo corrections for suppressing cumulative errors may be conducted during self-writing of patterns onto the recording disk.

DETAILED DESCRIPTION OF THE INVENTION

Specific embodiments of the present invention will be described in detail below referring to the accompanying drawings. The following description and drawings are partly omitted and simplified as appropriate for clarity of the description. Also, the same reference number is assigned to the same element in each drawing, and for the clarity of the description, overlapping description is omitted as necessary.

A first embodiment relates to self-writing of patterns onto a recording medium by a data storage device. That is to say, the present embodiment relates to a process in which the data storage device writes new patterns in sequence, with the patterns that the device has self-written onto the medium, as reference patterns. In the present embodiment, a servo pattern self-writing process in a hard-disk drive (HDD), an example of the data storage device, is taken as an example to describe the present invention.

A scheme in which an HDD writes servo patterns using its own mechanical system is known as self-servo writing (SSW). In an HDD of an exemplary embodiment, the functions that external circuits have performed during conventional SSW are built into the internal circuit itself of the HDD, on a product card (a substrate on which are mounted various ICs of the HDD as a finished product). This allows the HDD to write servo patterns onto a magnetic disk essentially by means of internal device components only, without depending directly on a servo writer that operates as an external device. In response to a starting signal from an external controller, the HDD writes the servo patterns onto the magnetic disk by activating the functions mounted in the internal circuit.

Figure 1:
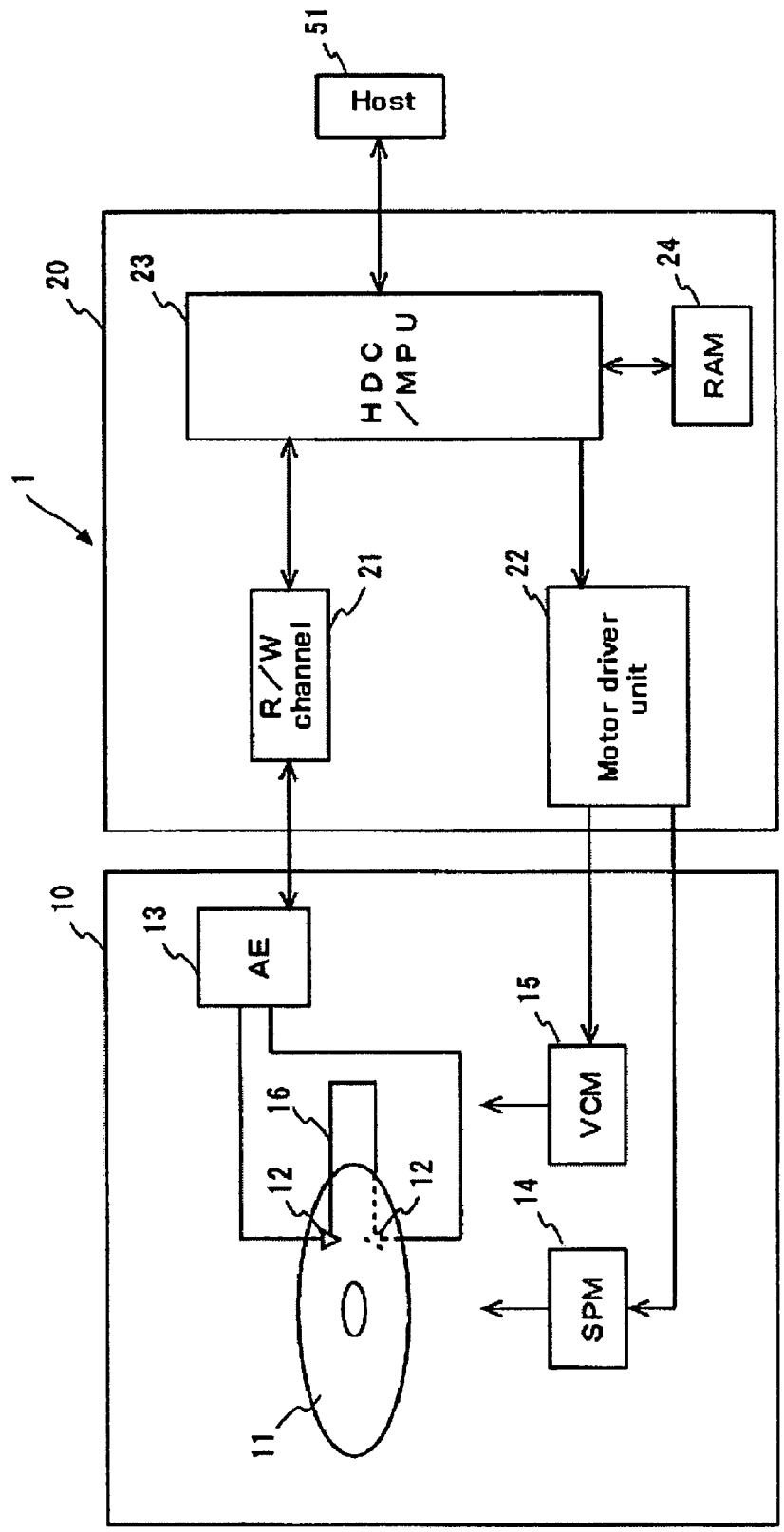
FIG. 1 is a block diagram showing a configuration of an HDD according to an embodiment.

Before an SSW process in the present embodiment is described, the total HDD configuration for executing the SSW process of the present embodiment is outlined below. FIG. 1 is a block diagram showing a schematic configuration of HDD 1. In a hermetically sealed enclosure 10, the HDD 1 has a magnetic disk (as an example of the recording medium), head element 12, arm electronics (AE) 13, a spindle motor (SPM) 14; a voice coil motor (VCM) 15, and an actuator 16.

The HDD 1 also has a circuit board 20 secured to the outside of the enclosure 10. A read/write channel (R/W channel) 21, a motor driver unit 22, a hard-disk controller (HDC)/MPU integrated circuit (hereinafter, HDC/MPU) 23, a RAM 24 as an example of a volatile memory, and other ICs are mounted on the circuit board 20. These circuits may be mounted as one IC or a plurality of split ICs.

Write data from an external host 51 is received by the HDC/MPU 23 and then written onto the magnetic disk 11 that is a non-volatile recording medium, via the AE 13 by the head element 12. Read data that has been stored onto the magnetic disk 11 is read by the head element 12, and the read data is output from the HDC/MPU 23 to the external host 51 via the AE 13 and the R/W channel 21.

Constituent elements of the HDD 1 are described next. The magnetic disk 11 is secured to the SPM 14. The SPM 14 rotates the magnetic disk 11 at a required speed. The motor driver unit 22 drives the SPM 14 in accordance with the control data sent from the HDC/MPU 23. The magnetic disk 11 in this embodiment has data-recording surfaces on both sides, and the HDD 1 has head element 12 as many as there actually are data-recording surfaces.

Each head element 12 is fixed to a slider (not shown). The slider is fixed to the actuator 16. The actuator 16 is coupled with the VCM 15 and pivotally moves around a pivot to move the head element 12 in a radial direction above the magnetic disk 11. The motor driver unit 22 also drives the VCM 15 in accordance with the control data (DACOUT) sent from the HDC/MPU 23.

The head element 12 is equipped with a write element for converting electrical signals into magnetic fields according to the data written onto the magnetic disk 11, and a read element for reconverting the magnetic fields arising from the magnetic disk 11, into electrical signals. The read and write elements will be described later. The number of magnetic disks 11 may be one or more, and a recording surface may be formed on one side or both sides of each magnetic disk 11.

Next, circuit blocks are described. The AE 13 selects, from the plurality of head element 12, one to be subjected to data access, preamplifies a read signal reproduced by the selected head element 12, and sends the signal to the R/W channel 21. A recording signal from the R/W channel 21 is also sent to the AE 13. For SSW, the AE 13 transfers a servo signal that the head element 12 has read out, to the R/W channel 21, and further transfers the write data (servo data) that has been sent from the R/W channel 21, to all head element 12.

The R/W channel 21 conducts a write process for the data that was transferred from the host 51. During the write process, the R/W channel 21 modulates the write data supplied from the HDC/MPU 23, into codes, then further converts the coded write data into write signals, and supplies the data to the AE 13. When the R/W channel 21 supplies data to the host 51, the channel 21 conducts a read process. During the read process, the read signal that has been supplied from the AE 13 is amplified to a certain target amplitude by the VGA (Variable Gain Amplifier) in the R/W channel 21 and data is extracted from the thus-acquired read signal and decoded by the R/W channel 21. The data read out includes user data and servo data. Decoded read signal is supplied to the HDC/MPU 23. The R/W channel 21 has a clock circuit, and SSW timing is controlled in accordance with the clock signals generated by the R/W channel 21.

The MPU in the HDC/MPU 23 is operated by the microcodes loaded into the RAM 24. When the HDD 1 is started, the data required for control and for data processing, in addition to the microcodes operating on the MPU, is loaded from the magnetic disk 11 or a ROM (not shown). The HDC/MPU 23 conducts command execution sequence, positioning control of the head element 12 by use of servo data, interface control, defect management, and other processes associated with data processing. The HDC/MPU 23 also executes total control of the HDD 1. The SSW process is conducted under the control of the HDC/MPU 23.

Figure 2:
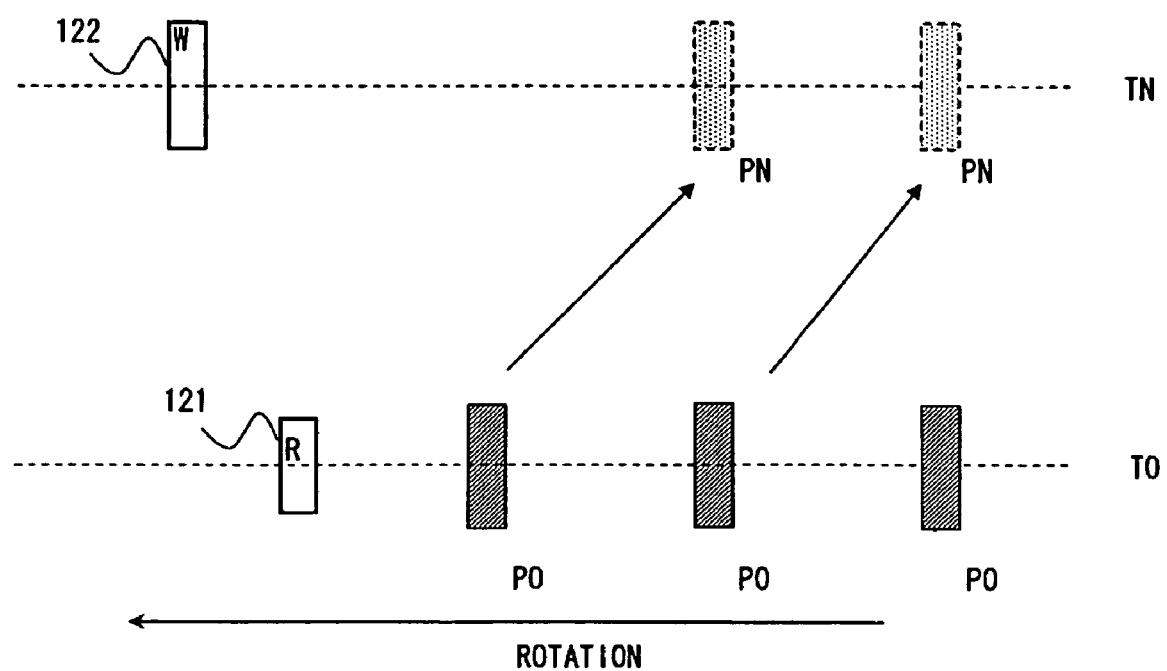
FIG. 2 is a diagram showing schematically an SSW method in the embodiment.

FIG. 2 schematically shows an SSW method. In this SSW method, while a read element 121 within the head element 12 reads out the patterns (POs) that have been written on an inside diametral (ID) or outside diametral (OD) servo track (TO), the internal write element 122 of the head element 12 that is disposed at an outside diametral or inside diametral servo track (TN) writes new servo patterns (PNs). More specifically, while the read element 121 follows the servo patterns of each sector of the reference track TO, the write element 122 writes new servo patterns onto track TN after required timing from detection of each sector. Servo patterns may be written onto the entire surface of the magnetic disk 11 by moving the head element 12 sequentially in an outside diametral or inside diametral direction.

The SSW process is composed of several sequences. Final servo patterns (Product Servo Patterns) which are used in the read/write operations of the user data are written onto the entire surface of the magnetic disk 11. In addition to a Product Servo Pattern self-propagation sequence in which a Product Servo Pattern present on the magnetic disk 11 is to be used to write another Product Servo Pattern, there is an initial sequence for writing Product Servo Patterns using other types of patterns. Self-writing of patterns according to the present invention may be used for self-writing of the above two types of patterns, provided that servo control is possible. An example of self-propagation of Product Servo Patterns will be detailed below. Hereinafter, Product Servo Patterns are called servo patterns.

Figure 3:
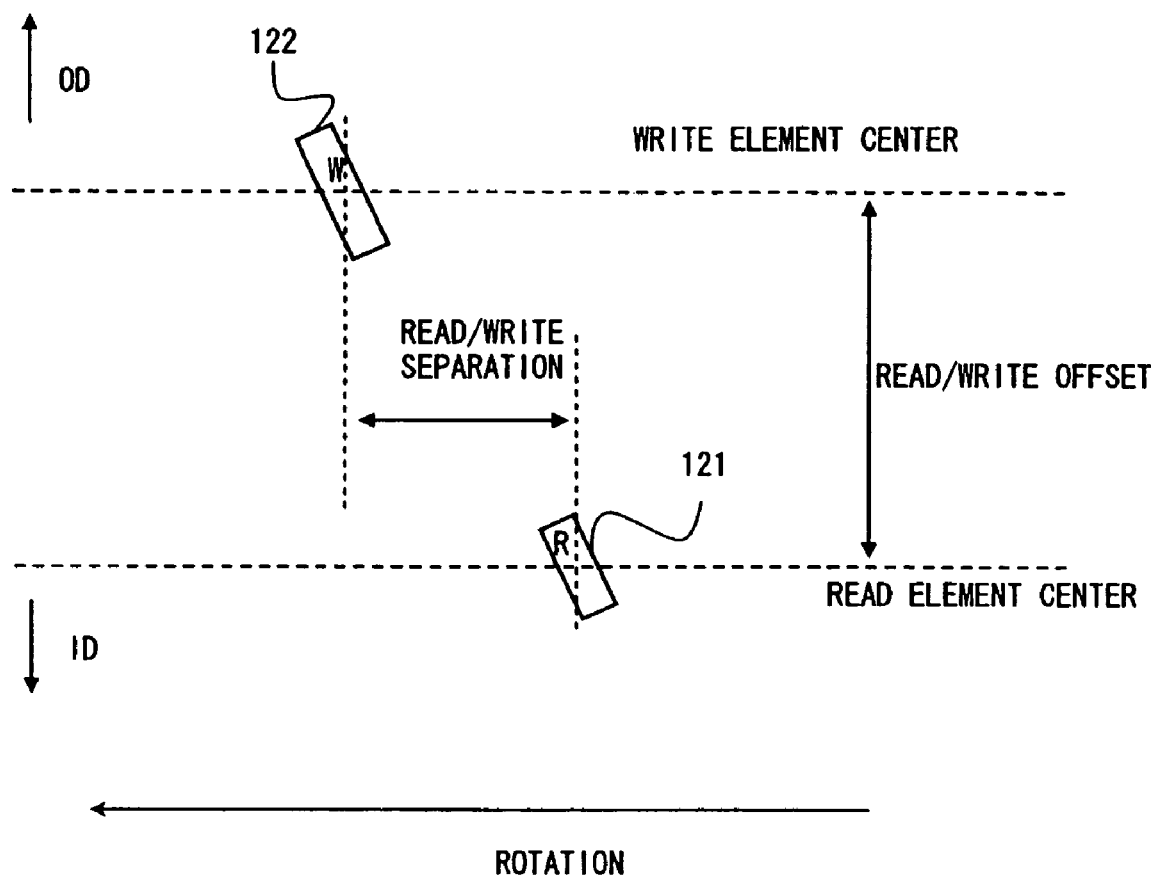
FIG. 3 is a diagram showing the relationship in position between a read element and write element in a head element section of the embodiment.

FIG. 3 shows the relationship in position between the read element 121 and write element 122 in the head element 12 of the present embodiment. In this example, the read element 121 is located closer to an inside diametral (ID) edge of the magnetic disk 11 than the write element 122. Since pattern writing is started from a position closer to the inside diametral (ID) edge, the read element 121 may sequentially read the patterns that have been written earlier by the write element 122. Thus, the write element 122 may write a new pattern while a position of the head element 12 is being matched according to the pattern read by the read element 121. The following describes an example of writing servo patterns sequentially from a position closer to the inside diametral edge. The SSW process may likewise be started from an outside diametral (OD) edge of the magnetic disk 11 by changing the positions of both the read element 121 and the write element 122. In SSW of the present embodiment, circumferential positions of the elements are not limited.

Additionally, FIG. 3 shows several values defined by the difference in position between the read element 121 and the write element 122. One is a read/write separation. The read/write separation is a time-varying difference in a circumferential direction of the magnetic disk 11 between the read element 121 and the write element 122. For example, a time from arrival of the read element 121 at a specific circumferential position on a specific track (i.e., a radial position) to arrival of the write element 122 at the same circumferential position on a different track by rotation of the magnetic disk 11 is called the read/write separation time.

A read/write offset is also one of the values defined according to the above-mentioned difference in position. The read/write offset is a radial distance between the read element 121 and the write element 122. More specifically, the read/write offset is the distance in a radial direction of the magnetic disk 11 between a read element center of the read element 121 and a write element center of the write element 122. Because of a skew angle, the read/write offset changes according to a particular radial position of the head element 12, and this offset typically increases as it goes toward the OD edge. The read/write offset also exists in the region of the head element 12 that ranges from the track position closest to the ID edge, to all positions on the track closest to the OD edge. Thus, servo patterns can be written on up to the outermost track by reading the written servo patterns from the innermost track position and matching the position of the head element 12.

The method of propagating servo patterns in an OD direction using the servo patterns that have already been written is described in further detail below. This sequence includes the process steps shown in FIG. 4. First, the read element 121 is moved to a servo track to be taken as a reference (step S11). Next, a time interval between servo patterns on the servo track is measured (step S12). Furthermore, writing timing of servo patterns is calculated from the above-measured time interval (step S13).

After this, the write element 122 actually writes servo patterns by using the writing timing calculated from the servo patterns that were read by the read element 121 (S14). In this case, half of the servo patterns of one servo track are written in one revolution of the disk. That is, a pattern-writing process for one servo track will be completed when the magnetic disk 11 rotates through two revolutions. When servo pattern writing on servo track is completed, the read element 121 will move to a servo track adjacent to the OD edge (step S15) and the above process will be repeated.

Figure 5:
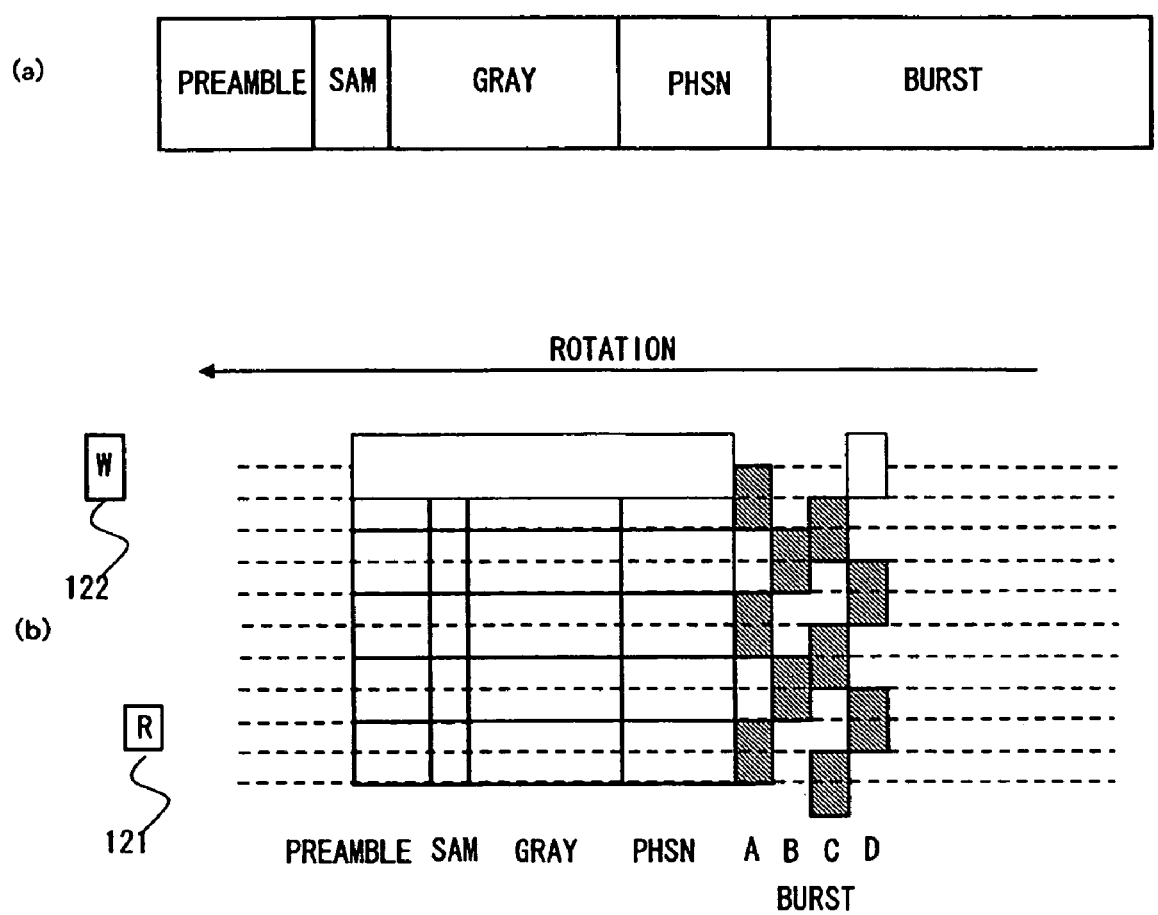
FIG. 5 includes diagrams showing a format of a servo pattern.

Positioning of the read element 121 (head element 12), measurement of the time interval between servo patterns, and timing control of servo pattern writing are conducted using specific portions of servo patterns. A pattern format of a servo pattern is described below referring to FIGS. 5(a) and 5(b). FIG. 5(a) shows a format of one servo pattern. The servo pattern is composed essentially of a preamble, a servo address mark (SAM), a gray-coded track ID (Gray), a servo sector number (PHSN), and burst patterns (Burst).

The preamble includes patterns for detecting a phase of a readout signal and for adjusting an amplification factor of a signal amplifier. The servo address mark indicates the beginning of servo data. The track ID indicates a track number of a track on which user data will be finally recorded. The servo sector number indicates an identification number of the servo sectors of the servo pattern in the track. Four kinds of patterns, A, B, C, and D, are provided as the burst patterns, and each amplitude of the burst pattern indicates a relative position of the read element 121 (head element 12) with respect to the track center.

FIG. 5(b) shows a plurality of consecutive servo tracks. More specifically, it shows the servo patterns written over 10 servo tracks. A servo track pitch is half of a data track pitch at which the user data will be stored, and FIG. 5(b) shows a servo track pitch equivalent to five data tracks. During SSW, servo patterns are written in sequence from the inside diametral edge, toward the outside diametral edge, in such a manner that a half of a pattern closer to the outside diametral edge is overlapped on a half of an existing pattern closer to the inside diametral edge.

Figure 4:
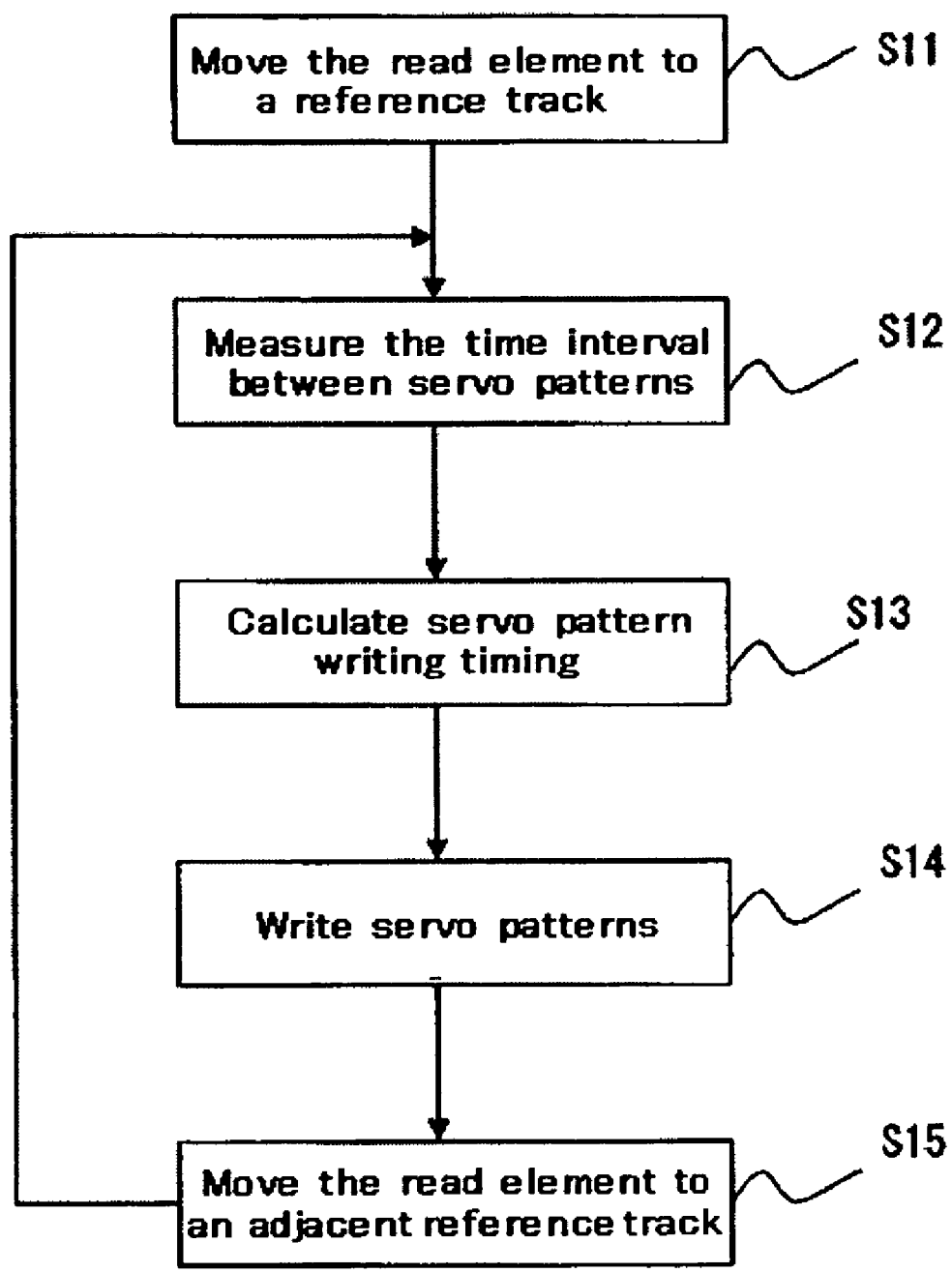
FIG. 4 is a diagram showing a method of using a servo pattern already written on an ID side and further writing additional servo patterns on an OD side.

As shown in the flowchart of FIG. 4, in step S11, the HDC/MPU 23 moves the read element 121 (head element 12) to a desired position using the track ID (Gray) and the burst patterns. In step S12, the time interval between servo patterns is measured using the readout timing of the servo address mark, and in step S14, the readout timing is further used as reference timing in servo pattern writing. Although it is preferable that the HDD 1 should propagate Product Servo Patterns using only the final Product Servo Pattern in order to minimize special additional functions for SSW, providing additional timing patterns or burst patterns in addition to these additional functions is not excluded from the present invention.

Figure 6:
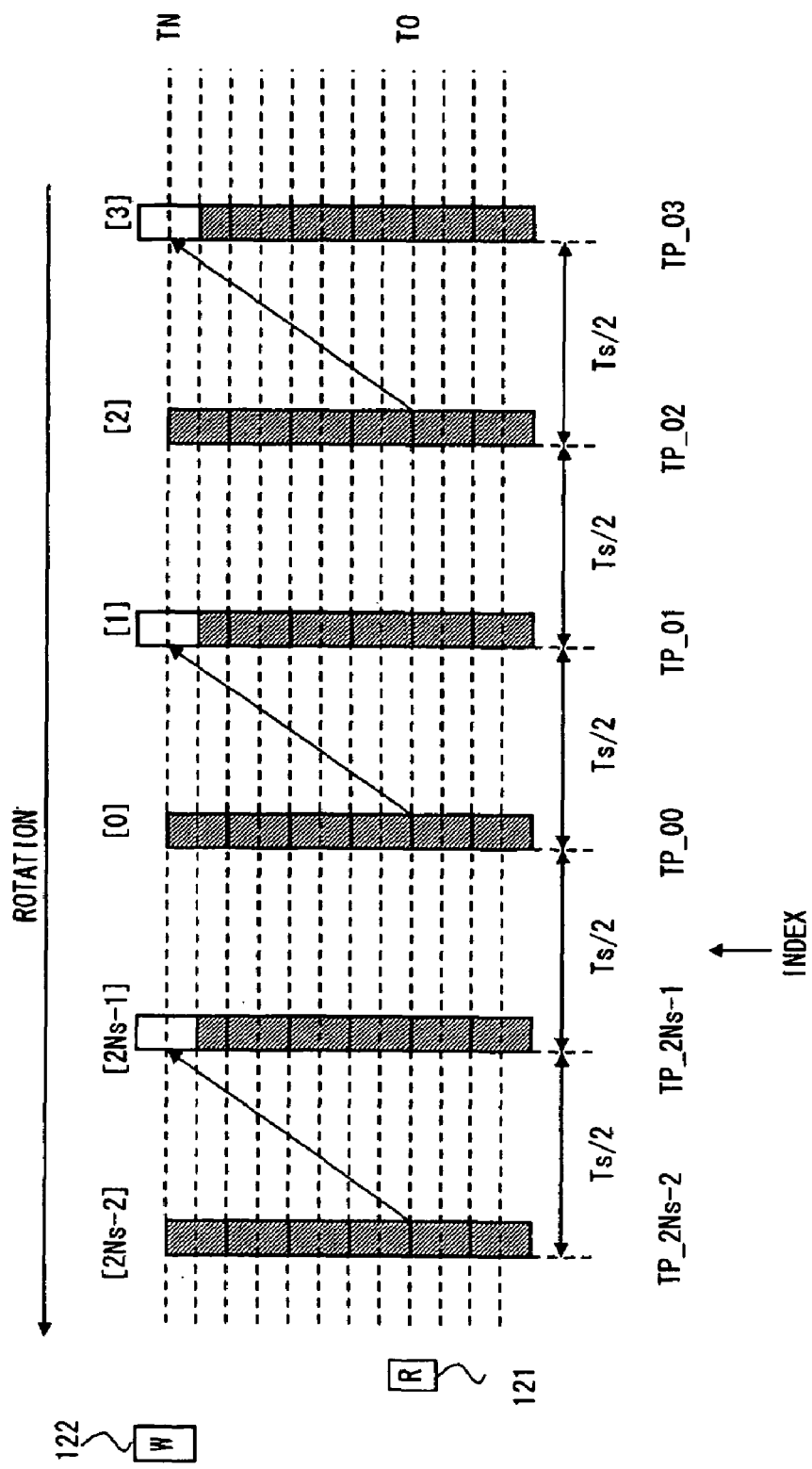
FIG. 6 is a diagram showing a method of rotating a magnetic disk through two turns, using a servo pattern already written on an ID side, and further writing additional servo patterns on the OD side.

The writing process for servo patterns is next described referring to FIGS. 4 and 6. In step S11 of FIG. 4, the read element 121 moves to a servo track TO to be used as a reference (see FIG. 6), and follows this reference servo track TO. The HDC/MPU 23 generates a servo track number and a position signal from the track ID and burst patterns read by the read element 121. This position signal indicates a deviation from the servo track center, and is proportional to the deviation (distance). The position signal is calculated from a ratio of the burst pattern amplitudes read by the read element 121.

Calculation of the burst position signal selectively uses A, B, C, or D, depending on the servo track. The HDC/MPU 23 positions the read element 121 so that these values become equal to required values. The SSW process according to the present embodiment features the positioning of the head element 12, especially, track following control thereof. This feature will be described later.

In step S12, the HDC/MPU 23 measures the time interval between servo patterns by measuring a time interval between SAM detection timing signals. The measurement of the time interval between servo patterns uses an Index as a reference, and is conducted using a clock signal generated by the R/W channel 21. The Index is a signal that the motor driver unit 22 for driving the spindle motor 14 generates according to particular counter-electromotive force of the spindle motor, and this signal is defined by a rotating period of the spindle motor 14.

In the example of FIG. 6, measurement results are defined as TP_00, TP_01, TP_02, etc. up to TP-_2*Ns−1, from the servo pattern immediately following the Index. Suffixes 00, 01, 02, etc. up to 2*Ns−1 are sector numbers, and the number of sector numbers in this case is twice the number of servo sectors "Ns" in the final product. The reason for this will be described later. If the final time interval between servo sectors (between servo patterns) is taken as "Ts", the time interval between servo patterns during propagation becomes equal to "Ts/2."

Next, in step S13, from the above-measured time interval, the HDC/MPU 23 conducts corrections for the read/write separation time of the head element 12 and a theoretical time from the preamble to SAM, and calculates writing timing. The writing timing indicates the start of servo pattern writing on an outside diametral track (TN) that is based on SAM detection timing of an inside diametral track (TO).

In step S14, servo patterns are written on the outside diametral track TN by using the above calculation results and the servo pattern of the previously written tracks. The servo patterns are written using two rotations of the magnetic disk 11. In the first rotation, servo patterns of odd-numbered sectors are written during track following to servo patterns [0], [2], [4], [6], etc. of even-numbered sectors as respective references. In the next rotation, the servo patterns of even-numbered sectors are written during track following to servo patterns [1], [3], [5], [7], etc. of odd-numbered sectors as respective references (this sequence may be reversed). The head element 12 usually cannot conduct read and write operations at the same time. For this reason, for example, if the writing of first servo pattern [1] on the outside diametral track, based on the inside diametral reference track, is being conducted, the read element 121 cannot read first servo pattern [1] on the inside diametral reference track.

As described above, servo patterns twice as many as actually necessary are written. When the servo patterns in the product are used, half of these patterns (only of odd-numbered or even-numbered sectors) are actually used. In this case, odd-numbered sectors and even-numbered sectors need to be written in independent rotations. It is preferable that odd-numbered sectors and even-numbered sectors be distinguished by using different types of SAMs.

The above sequence may be used to form a track (TN) of new servo patterns (PNs) on an outside diametral side by following the servo pattern (PO) already written on the inside diametral reference track (TO). During the propagation of writing a new track TN at the outside diametral side in this fashion, radial accuracy of the pattern PO to become a base for the inside diametral side (i.e., positioning accuracy of the head element 12) is expected to be basically inherited intact to the new patterns (PNs) written. Because of the factors causing various errors, such accuracy is deteriorated by the propagation. Decreases in positioning accuracy cause burst patterns A, B, C, and D to deviate from positions in which the patterns originally should be, and these deviations are inherited during the next propagation. This process also depends on the coefficients of the closed loop transfer function of track following servo of the head element 12. The deterioration of accuracy is of a complex mechanism involving various factors in this way.

In order to prevent the deterioration of the accuracy of the track shape due to such propagation, a deviation from a target position of reference track TO during the writing of servo track TN is stored in the SSW process of the present embodiment. A signal indicative of the deviation from the target position is called "position error signal" (PES). The position error signal (PES) may be expressed as (target position—current position) by being derived from the servo signal read out by the head element 12.

When the track TN is subsequently followed, a radial propagation error is suppressed by correcting positioning target data using the PES stored during track TN writing. That is, when the TO track is to be followed and a new track TN is to be written, the track-following PES generated when the track TO was written is stored and this PES is used to correct the target data intended to follow the track TO. The target data is corrected for each sector.

Figure 7:
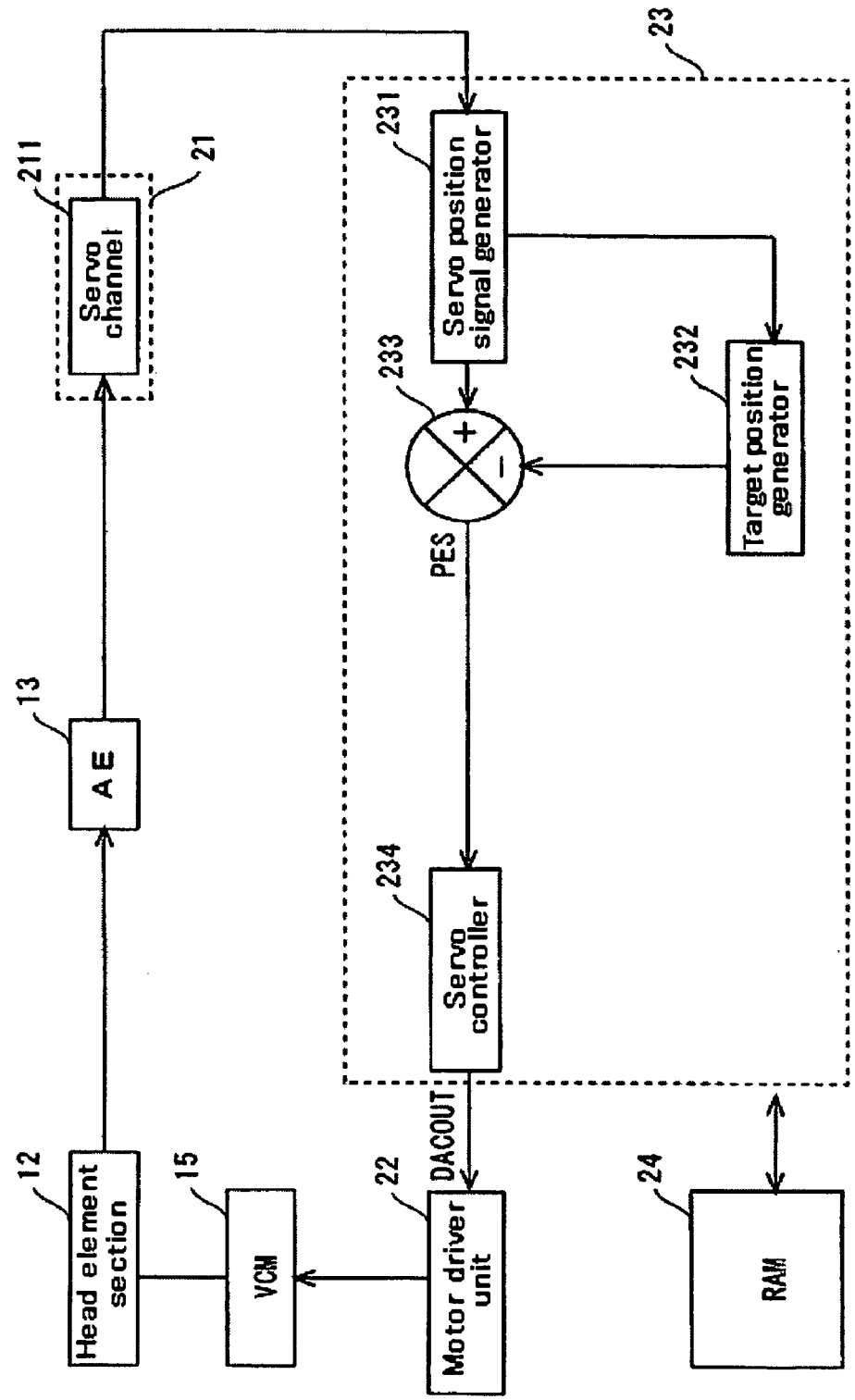
FIG. 7 is a block diagram showing a configuration of a servo system according to an embodiment.

Before a detailed method of calculating correction data is described, a servo system of the HDD 1 is described below. FIG. 7 is a block diagram showing a configuration of the servo system in the present embodiment. The R/W channel 21 has a servo channel 211 for extracting a servo signal from the signals output from the AE 13. The HDC/MPU 23 has a servo position signal generator 231 for generating a servo position signal, a target position generator 232 for setting a target position of the head element 12, a position error calculator 233 for calculating a difference between the servo position signal and the target position signal sent from the target position generator 232 as a reference signal, and a servo controller 234 that outputs to the motor driver unit 22 a digital control signal (DACOUT) for controlling the VCM 15 (i.e., for controlling the amount of electric current of the VCM 15).

Internal constituent elements of the HDC/MPU 23 may be realized according to a particular hardware configuration or by operation of microcodes on the MPU. An appropriate hardware/software configuration is selected according to design. Logical blocks for executing necessary processing may be designed so that the blocks are mounted in whatever hardware configuration.

At a required sampling frequency, the servo channel 211 conducts an A/D conversion on the analog servo signal received from the AE 13. The servo channel 211 further decodes a servo address from the A/D converted signal. The thus-decoded address and the A/D converted burst signal are transferred to the servo position signal generator 231.

The servo position signal generator 231 generates a servo position signal indicative of a current position of the head element 12, on the basis of the servo signal from the servo channel 211. More specifically, the servo position signal includes a track number and a burst position signal. The servo position signal generator 231 also generates sector numbers. The track number and the burst position signal are input to the position error calculator 233, and each sector number is input to the target position generator 232. For example, data with the track number as higher-order bits and the burst position signal as lower-order bits is input to the position error calculator 233.

The target position generator 232 outputs a target position signal that indicates a target position to which the head element 12 (read element 121) is to move. The target position signal is input to the position error calculator 233, and this signal includes the track number indicating the target position, and the burst position signal. The HDD 1 of the present embodiment features processing of the target position generator 232. A detailed description of this feature will be given later.

The position error calculator 233 compares the servo position signal to the target position signal and generates a position error signal (PES) that indicates a magnitude and direction of a deviation of the current position with respect to the target position. PES indicates the amount of shifting of the head element 12 with respect to the target position, internally or externally to the magnetic disk 11 in its radial direction.

PES that has been generated by the position error calculator 233 is input to the servo controller 234. The servo controller 234 generates the digital control signal DACOUT of the VCM 15 in accordance with PES. DACOUT is input to the motor driver unit 22, which then conducts a D/A conversion of DACOUT value, thus supplying a required electric current value.

As described above, the HDD 1 of the present embodiment has a feature in the generation of the target position signal by the target position generator 232. The target position generator 232 stores PES beforehand during track writing and corrects the target position by use of the PES stored for following of the track. The target position is corrected for each sector, and if the total number of sectors is taken as N (equivalent to 2Ns−1 in FIG. 6), a correction value "Corr[m]" for a target value at each sector "[m]" (with the index as a reference) is given by a multiply and add operation (matrix operation) in following numerical formula (1):

$$Corr[m] = \sum_{t} T_{m,t} \times PES_t \quad 0 \le t \le N-1 \qquad \text{Numerical formula 1}$$

Figure 8:
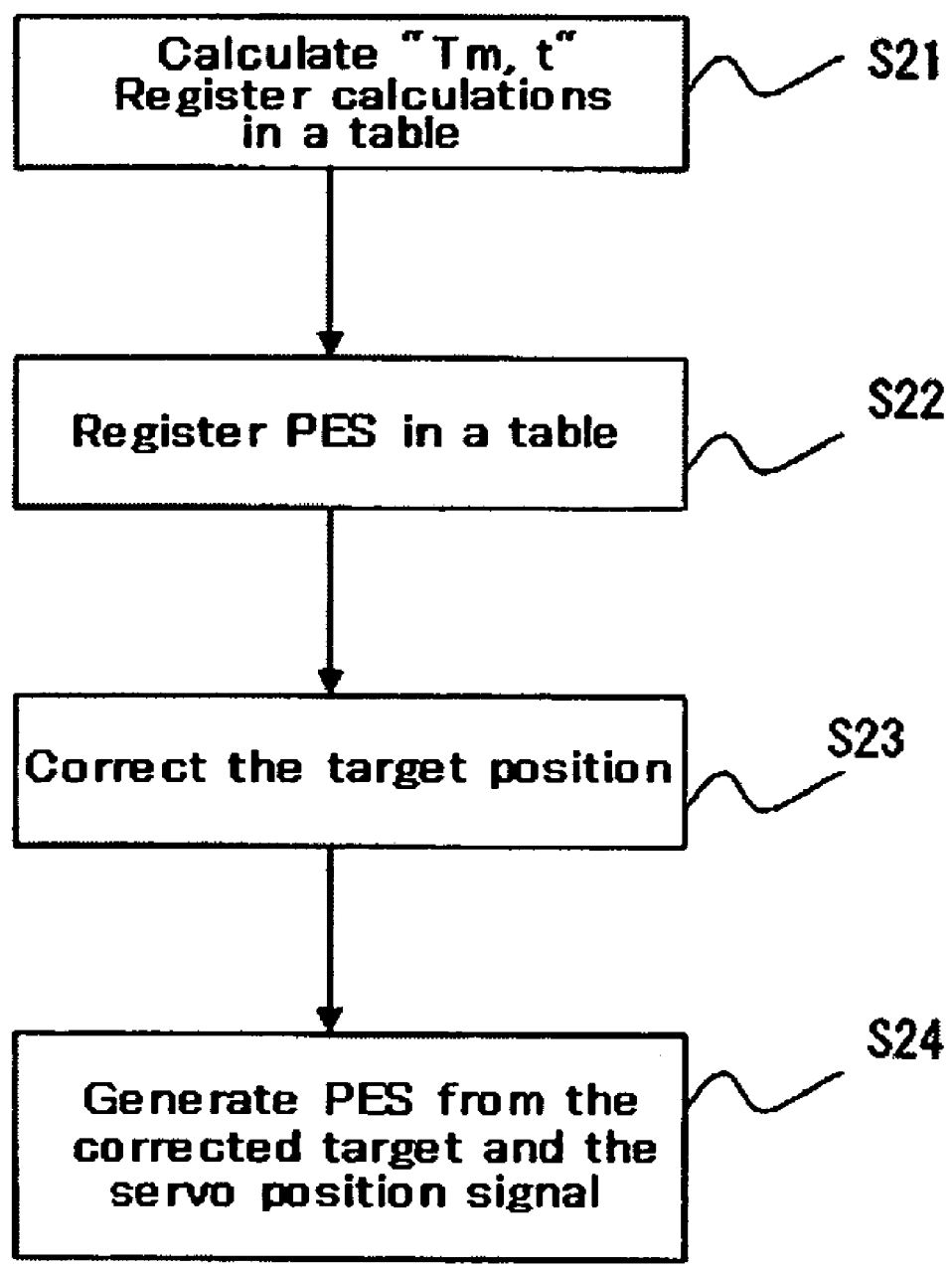
FIG. 8 is a flowchart showing target position signal generation by a target position generator.

As shown in a flowchart of FIG. 8, the target position generator 232 calculates each coefficient "Tm, t" of the multiply and add operation beforehand and registers "Tm, t" in an internal table of the RAM 24 (step S21). When writing tracks, the position error calculator 233 outputs PES to the servo controller 234 and at the same time, registers PES of each sector in the internal table of the RAM 24 (step S22). During track following of each track, the target position generator 232 corrects the target position by using the PES generated by writing of the track, and coefficient "Tm, t", and outputs the thus-corrected target position signal to the position error calculator 233 (step S23). The position error calculator 233 compares the servo position signal to the corrected target position signal, and generates PES (step S24).

As shown in step S21, since the target position generator 232 acquires coefficient "Tm, t" before track-following timing is reached, even the HDD1-mounted MPU of small computing power, unlike a dedicated self servo writer, may process the correction of the target position within a short time, during track following. Although each coefficient "Tm, t" may be the same for the entire magnetic disk 11, each coefficient "Tm, t" is preferably re-computed by executing calibration at intervals of about several thousands of tracks. Since change in the effect of the air flow and other factors differ according to actuator position, it is preferable that the calibration of coefficient "Tm, t" be executed at appropriate track intervals.

A method of calculating coefficient "Tm, t" is described next. As can be understood from numerical formula (1), a correction data vector "|Corr>" that takes sector correction values as its element may be expressed as a determinant inclusive of a PES vector taking each sector's PES as its element, and of a correction matrix taking a correction coefficient as its element.

$$|Corr\rangle = [T]|PES\rangle \quad \text{Numerical formula 2}$$

where correction matrix T is expressed as $$[T] = \frac{1}{N}[IF][G][F] \quad \text{Numerical formula 3}$$

and each correction value "Corr[m]" can be expressed as follows:

$$Corr[m] = \frac{1}{N}\sum_n\sum_s\sum_t IF_{m,n} \times G_{n,s} \times F_{s,t} \times PES_t \quad \text{Numerical formula 4}$$

In numerical formulae (3) and (4), IF is an inverse discrete Fourier transform matrix, G is a gain matrix taking a frequency-associated correction coefficient as its element, and F is a discrete Fourier transform matrix. That is to say, frequency characteristics of the PES generated during writing are modified. The gain matrix suppresses a propagation amplification of a track position error during a servo-writing process, by correcting only large-gain components among all frequency components of the closed servo loop response obtained during the writing process. Preferably, the propagation amplification level is determined to be less than 1 at all frequencies. This allows accidental errors to be effectively reduced while at the same time suppressing additional errors.

PES is basically a periodic function taking a rotating frequency as a period. All such periodic function waveforms have a frequency spectrum that includes non-zero amplitude only in a discrete set composed essentially of frequencies associated with integer multiples of a fundamental frequency. In this case, a rotating frequency of the magnetic disk 11 corresponds to the fundamental frequency. In this case, frequencies in the integer multiples of the fundamental frequency may be usable as the frequencies at which the propagation amplification of a track position error during servo writing is to be kept less than 1.

An actual propagation amplification, as a frequency-dependent function, of a track position error due to servo writing, is a vector of complex numbers which have both magnitude and phase, and components of this vector are associated with a multiple of the rotating frequency of the magnetic disk 11. Magnitudes of the vector components must be less than 1. During actual operation, the propagation amplification level of a track position error during servo writing becomes 1 or more, only at frequencies of up to a limited multiple, among all integer multiples of the rotating frequency of the magnetic disk 11 (fundamental frequency). Therefore, it is enough just to conduct corrections only at those limited frequencies, in which the magnitude of closed loop transfer function is large.

As described in the above Patent Reference 1, propagation amplification level S of a track position error due to self servo writing can be expressed as $S=C+g(1-C)$, by the correction using the PES generated during writing. Symbol C is a transfer function of the servo loop, and it is a closed-loop response of the servo loop existing before the correction. Transfer function C is equivalent to the loop from an output of the position error calculator 233 in FIG. 7 to an input of the calculator 233. Symbol "g" in the above expression is a correction gain factor, indicating a rate of the PES which becomes a correction value.

As described above, the propagation amplification, $S=C+g(1-C)$, of a track position error due to self servo writing, is adjusted at plural frequencies in the integer multiples of the fundamental frequency. Preferably, S is adjusted for a magnitude less than 1 at all frequencies in the integer multiples of the fundamental frequency. That is, at all $$T_{m,t} = \frac{1}{N}\sum_n\sum_s \exp\left(-2\pi i\frac{mn}{N}\right)\delta_{ns}g_n\exp \quad \text{Numerical formula 6}$$

$$\left(2\pi i\frac{st}{N}\right)$$

$$= \frac{1}{N}\sum_n g_n\exp\left(2\pi i\frac{n(m-t)}{N}\right)$$

and the matrix takes a function of (m–t).

It is derived from the above formula that the following relationship represented by numerical formula (7) is satisfied between the elements of matrix T:

$$T_{m+k,t+k}=T_{m,t}=T_{m-t}$$

$$T_{m,t}=T_{t,m} \quad \text{Numerical formula 7}$$

where, if matrix T is expressed as "$T_{m,t}=T_{m-t}$", the following holds:

$$[T] = \begin{bmatrix} T_0 & T_1 & T_2 & T_{N-1} \\ T_{N-1} & T_0 & T_1 & T_{N-2} \\ T_{N-2} & T_{N-1} & T_0 & T_{N-3} \\ & & & \\ T_1 & T_2 & T_3 & T_0 \end{bmatrix} \quad \text{Numerical formula 8}$$

This, as shown in above numerical formula (1), indicates that a multiply and add operation between PES and matrix T is conducted for each sector during writing. Additionally, as can be seen from each matrix element, it is possible to change a term of the product summation cyclically each time the sector changes by 1, and thus to calculate correction values using a simplified calculation method. That is, correction value "Corr[m]" for the target value at each sector [m] is given by the following formula:

$$Corr[m] = \sum_{t=0}^{N-1} T_{N-m+t}PES_t \quad \text{Numerical formula 9}$$

$$= \sum_{k=m}^{m-1} T_{k-m}PES_k$$

("k" and "k–m" are both a cyclic number of 0~N–1)

Figure 9:
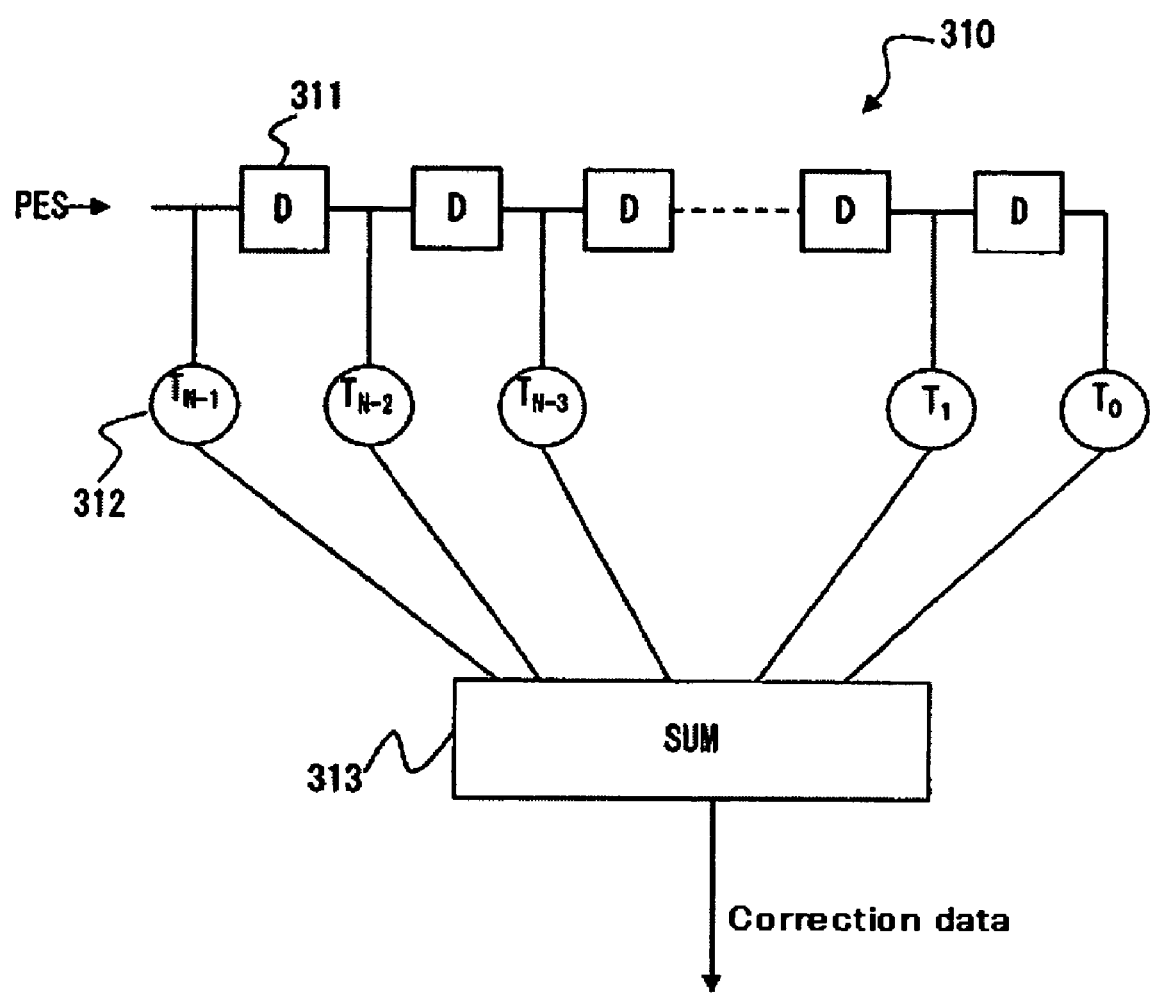
FIG. 9 is a block diagram showing a functional configuration of an FIR filter in the target position generator.

This arithmetic process may be mounted as a finite impulse response (FIR) filter. The FIR filter has an MPU-based efficient computing capability, which allows high-speed processing, even with an MPU of small computing power. As shown in FIG. 9, an FIR filter 310 includes a delay element 311 for producing one clock of delay, a weighting function 312 (arithmetic integration) that takes an element of matrix T as a coefficient, and a summation element 313 that adds the data processed using the weighting function 312.

The FIR filter 310 is an FIR filter having an N number of taps, and weighting functions $T_0$ to $T_{N-1}$ are coupled with the respective taps. This means that an output from each tap is arithmetically multiplied by a tap weight. PESs of sectors [0] to [N-1] are sequentially input to the FIR filter 310. For example, during computing of sector[0], values of PES[0] to PES[N-1] are output from the respective taps. The FIR filter 310 may be configured as hardware. In terms of flexibility of design, however, it is preferable that the filter be mounted in a microcode format and that an FIR process be conducted using an MPU.

Figure 10:
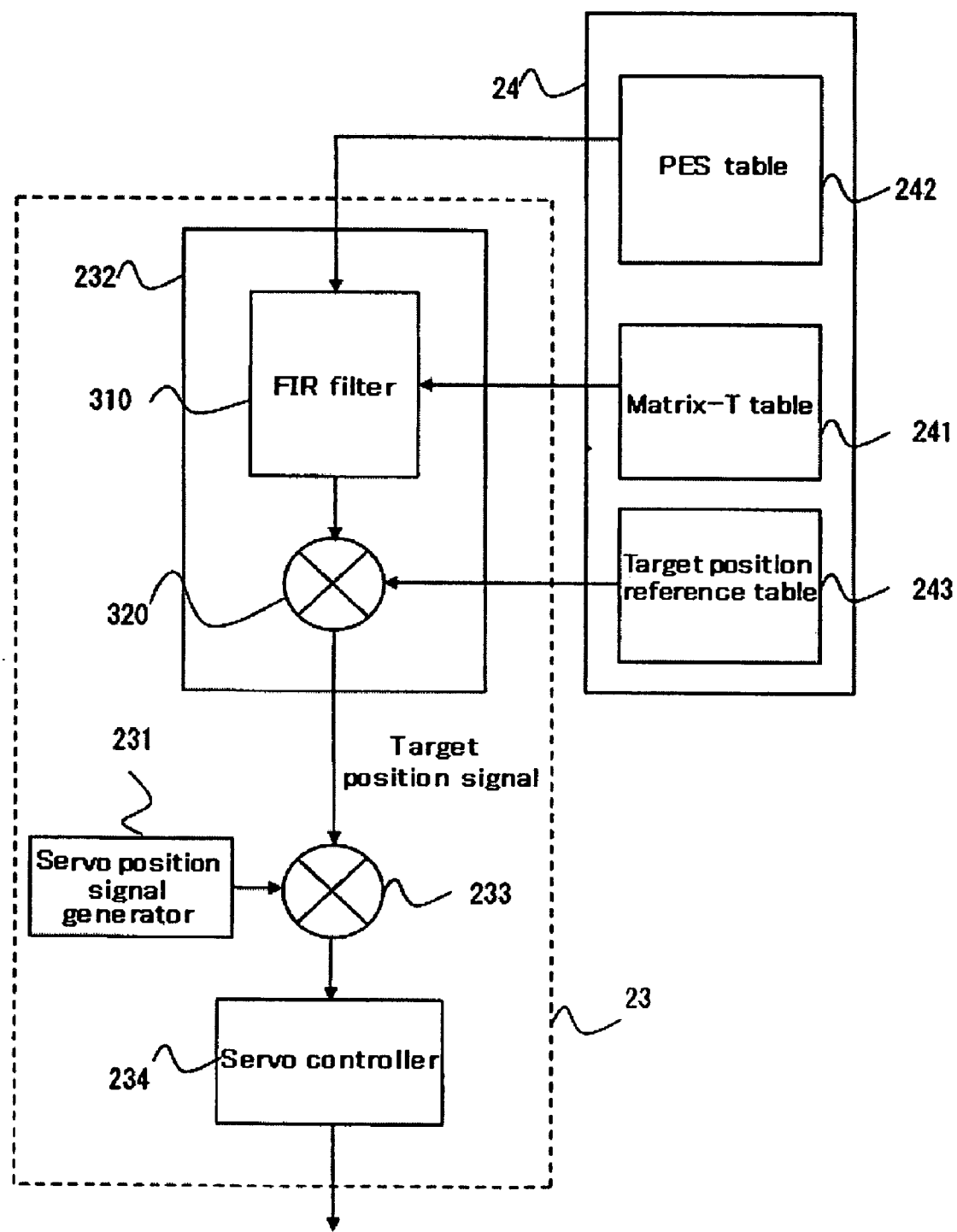
FIG. 10 is a block diagram of a functional block for the generation of a target position signal.

FIG. 10 is a block diagram of a functional block for generating a target position signal. In the RAM 24, a Tap weight table 241 registers each element of matrix T and a PES table 242 registers PES of each sector during servo track writing. PES associated with each sector during read track writing is registered in the PES table 242 by the target position generator 232. Also, reference values of the target values of the servo position signal that are associated with respective servo tracks are registered in a target position reference table 243. More specifically, the target position signal includes a target track number and target PES reference values.

The target position generator 232 acquires matrix elements, namely, weighting coefficients, from the matrix-T table 241, and uses the coefficients as weighting functions 312 of the FIR filter 310. In following operation timing of the read element 121, the target position generator 232 generates sector correction values by acquiring the PES of each sector of the associated servo track registered in the PES table 242, and sequentially entering the PES into the FIR filter 310. The target position generator 232 further acquires target reference values from the target position reference table 243 and corrects each target reference value by use of an appropriate correction value that has been generated by a correction arithmetic unit 320. The target position generator 232 outputs the corrected target value as a target position signal to the position error calculator 233.

It is important here that the number of taps in the FIR filter 310 be preferably reduced for shorter multiply and add operations of numerical formula (9) and thus for improved processing performance. Reduction in the number of taps allows reduction in correction data calculation time. It is important, however, to avoid reduction in accuracy of the correction due to reducing the number of taps, and thus to prevent significant position errors due to accumulation of propagation errors. The present inventors found that selecting a specific element of matrix T allows the accumulation of propagation errors to be prevented by taking the remaining elements as 0s, i.e., without using the remaining elements.

More specifically, the multiply and add operations may be shortened considering only the limited number of elements preceding and following the $T_0$ component in matrix T. The $T_0$ component means that the sector read by the read element 121 and the sector written in by the write element 122 are the same. That is, when sector [k] is written, the target position is corrected using the PES of the preceding and following plural sectors inclusive of that sector. Deviations of each sector in terms of position exhibit a strong correlation with positional deviations of sectors adjacent to that sector, and the correlation becomes weaker as the sector moves away. In other words, as the sector moves away, T decreases in value. Accordingly, sufficient positional deviation correction may likewise be achieved by using, in the summing operations, only the positional deviations of that sector and adjacent sectors.

Figure 11:
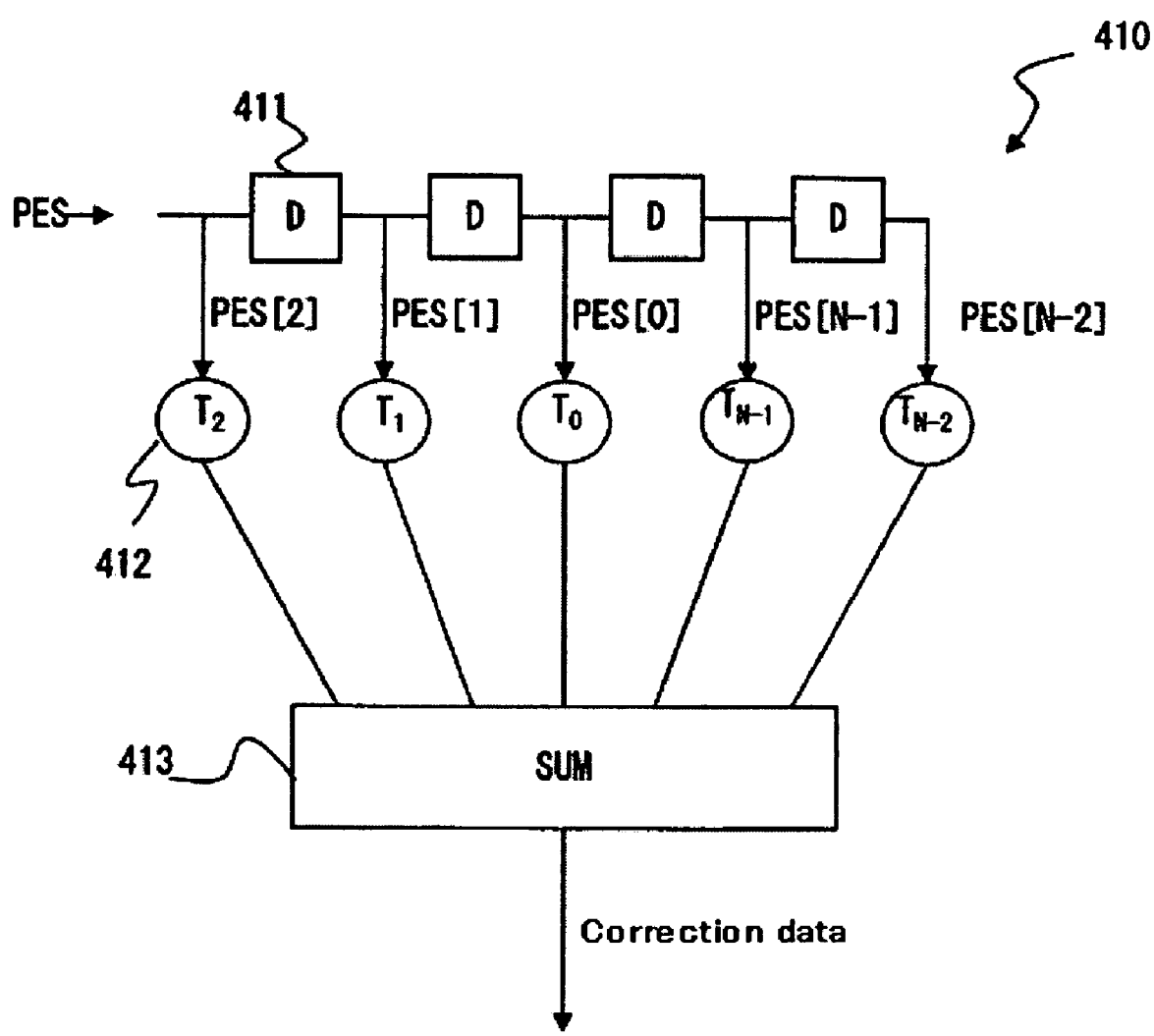
FIG. 11 is a functional configuration diagram shown an example of a five-tap FIR filter in the target position generator.

An FIR filter 410 with five taps, for example, that allows for two elements each preceding and following the $T_0$ component is shown in FIG. 11. Using the FIR filter 410 means that only $T_{N-2}, T_{N-1}, T_0, T_1, T_2$ are used in the matrix of numerical formula (8). Outputs from each tap are arithmetically processed using the weighting functions 412 that have coefficients of $T_{N-2}, T_{N-1}, T_0, T_1, T_2$, respectively, and then the outputs are added in a summation element 413. FIG. 11 illustrates an arithmetic operation state of sector [0], and PES[N-2], PES[N-1], PES[0], PES[1], and PES[2] are input from each tap to the weighting functions 412 of $T_{N-2}, T_{N-1}, T_0, T_1, T_2$, respectively.

During the correction data calculation of each sector, the PES of each sector is sequentially input to the FIR filter 410. For example, during an arithmetic operation of sector[1], PES[3] is input to the FIR filter 410 and during an arithmetic operation of sector[2], PES[4] is input to the FIR filter 410. Other PESs are also input to the FIR filter in a like manner. The arithmetic operation state in FIG. 11 can be expressed as follows in terms of matrix formula:

$$Corr[0] = (T_{N-2}, T_{N-1}, T_0, T_1, T_2) \begin{bmatrix} PES_{N-2} \\ PES_{N-1} \\ PES_0 \\ PES_1 \\ PES_2 \end{bmatrix} \quad \text{Numerical formula 10}$$

The PESs of the plural consecutive sectors each including the PES of the same sector as the write sector, are used in this way during the calculation of correction value. The appropriate number of sectors that is smaller than the total number of sectors is selected according to design and only the selected number of sectors are used. Since deviations of each sector in terms of position each have a strong correlation with positional deviations of sectors adjacent to that sector, it is preferable that the calculation of the correction data should include the PESs of the sectors preceding and following the particular sector. A preferable example is to use several consecutive sectors or several tens of consecutive sectors as many as the sectors preceding and following the sector.

Figure 12:
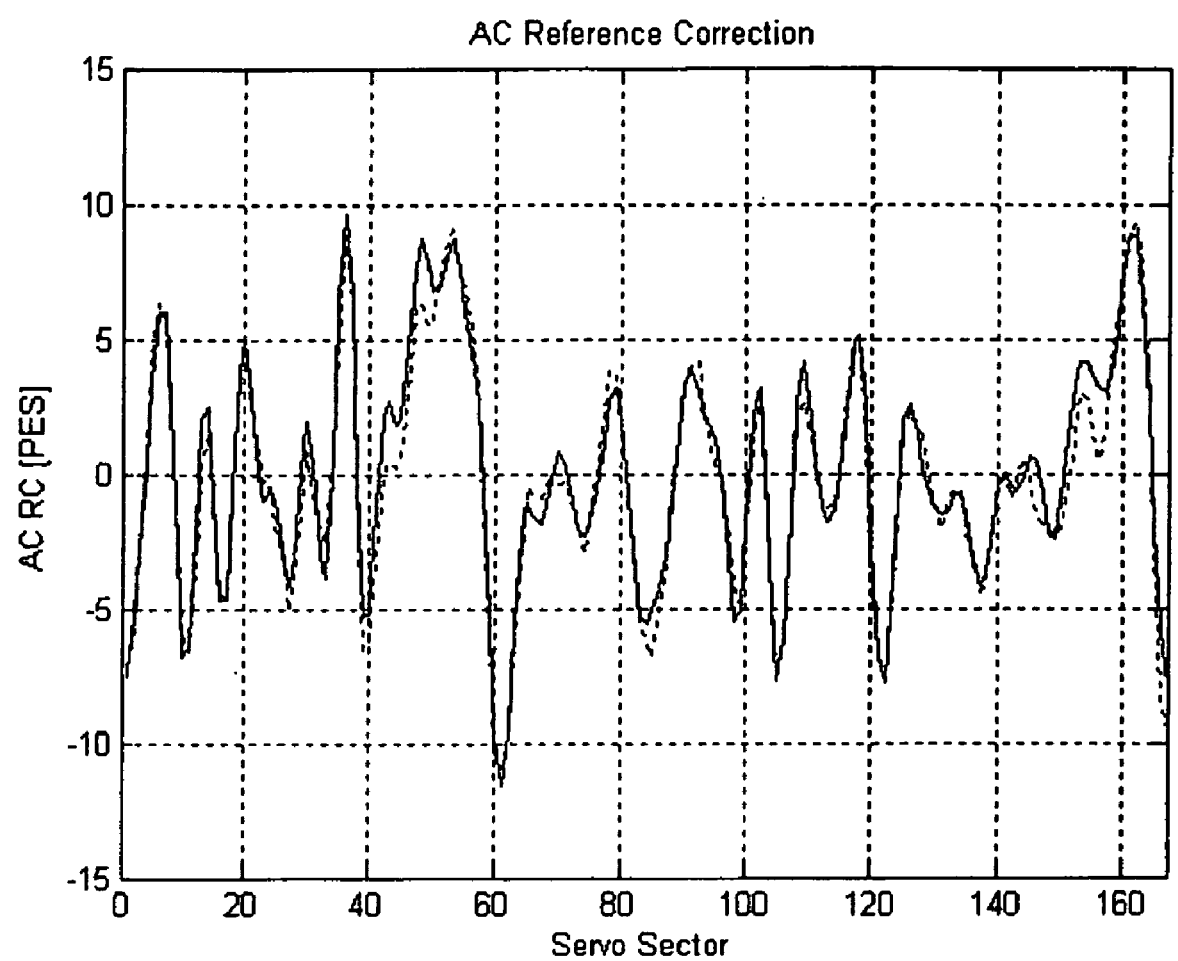
FIG. 12 is a graph showing a distribution example of an element of the first row in matrix T with 168 sectors.
Figure 13:
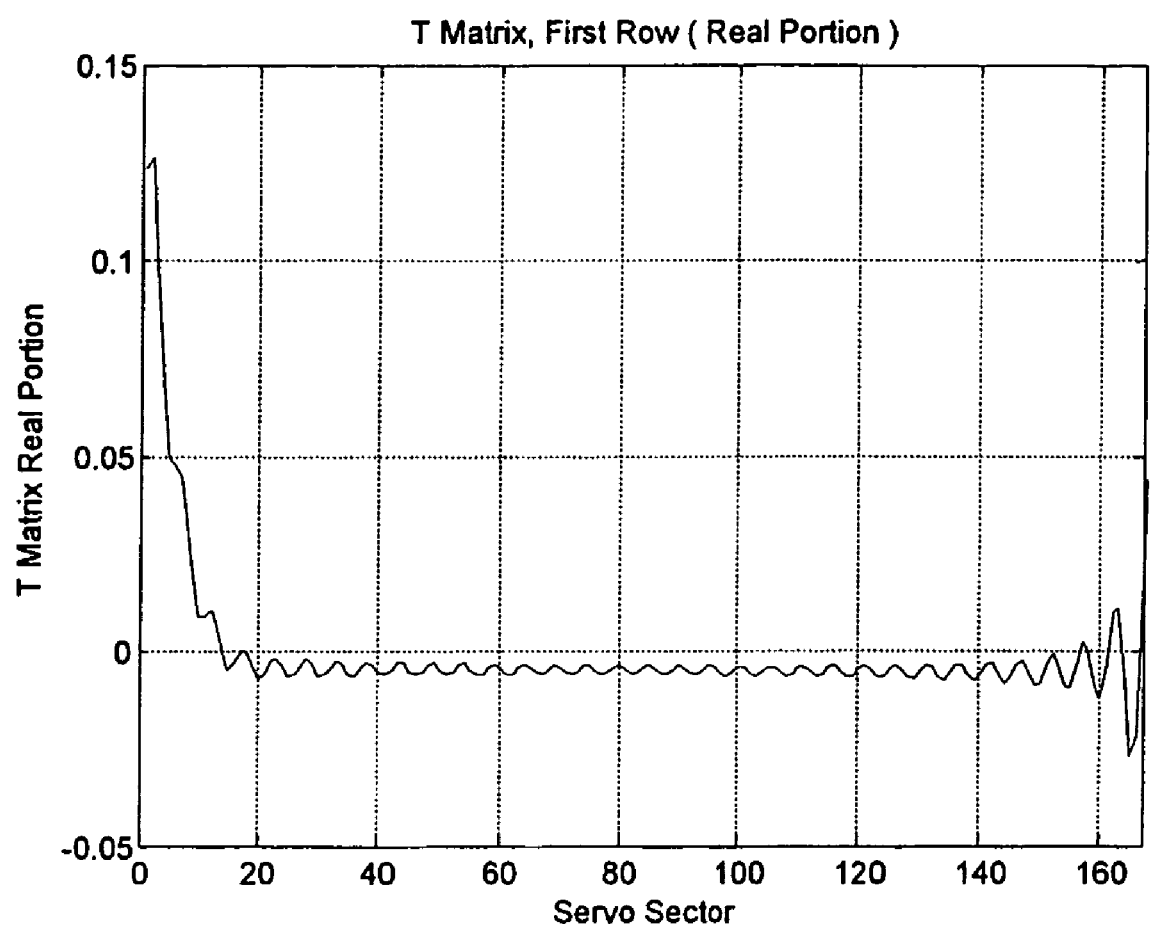
FIG. 13 shows calculations on the two different sets of correction data applied to the same input error when an FIR filter with 25 taps was used, and when all 168 sectors all underwent arithmetic processing.

FIG. 12 is a graph showing an example of the distribution of the elements of the first row in matrix T with 168 sectors, which was obtained by a numerical simulation. It can be seen from FIG. 12 that only elements of small arguments are effective in matrix T. Additionally, FIG. 13 shows calculations on the two different sets of correction data applied to the same error input. One set of correction data relates to using 12 elements adjacent to $T_0$, i.e., using an FIR filter of 25 taps, and the other set of correction data relates to arithmetic processing of all 168 sectors. In FIG. 13, a solid line denotes the use of the 25-tap FIR filter and a dotted line denotes arithmetic processing of all 168 sectors. As shown in FIG. 13, results equivalent to all-sector arithmetic processing were obtainable using the 25-tap FIR filter.

While the present invention has been described above taking an exemplary embodiment thereof as an example, the invention is not limited to the embodiment. Any person skilled in the art can easily modify, add, and/or change each element of the above embodiment, within the scope of the invention. The present invention is applicable to not only a magnetic disk drive, for example, but also a data storage device that uses other types of recording media. Alternatively, the present invention is particularly useful for self-writing of servo patterns and does not hinder application to self-writing of other patterns.

What is claimed is:

1. A method for writing patterns of sectors, in which, on a rotating recording disk, while a read element is following a first track by means of servo control, a write element different from the read element in terms of radial position writes patterns of each sector of a second track different from the first track, with patterns of each sector of the first track as reference patterns, said method comprising:

writing servo patterns of plural sectors of the first track;

calculating correction data by multiply and add operations between position errors from a target position of the read element, which are associated with each sector during the writing of the first track, and a set of coefficients pre-registered to suppress propagation amplification levels of track position errors due to servo writing at selected frequencies in closed loop response of servo positioning of a servo loop;

positioning the read element at each sector of the first track by conducting servo control corrections using the correction data; and with the read element positioned, activating the write element to write the patterns of each sector onto the second track by using the patterns of each sector of the first track as reference patterns.

2. The method for writing patterns of sectors according to claim 1, wherein the servo control corrections are conducted to correct the target position with respect to each sector of the first track by use of the correction data.

3. The method for writing patterns of sectors according to claim 1, wherein the set of coefficients is set such that the propagation amplification of track position errors during servo writing become less than 1 at all frequencies in the integer multiples of a rotating frequency of the recording disk.

4. The method for writing patterns of sectors according to claim 3, wherein the calculation of the correction data with respect to each sector of the first track is conducted by multiply and add operations between any position errors occurring during writing of consecutive plural sectors inclusive of the sector and fewer than the total number of sectors of the first track, and the set of coefficients.

5. The method for writing patterns of sectors according to claim 4, wherein the calculation of the correction data with respect to each sector of the first track is conducted by multiply and add operations between any position errors occurring during writing of consecutive plural sectors including the sectors preceding and following the sector, and the set of coefficients.

6. The method for writing patterns of sectors according to claim 4, wherein the calculation of the correction data with respect to each sector of the first track is conducted by multiply and add operations between consecutive plural sectors inclusive of a definite number of sectors preceding and following the sector, and the set of coefficients.

7. The method for writing patterns of sectors according to claim 3, wherein the rotating frequency of the recording disk is a fundamental frequency.

8. The method for writing patterns of sectors according to claim 1, wherein the set of coefficients is set such that the propagation amplification of track position errors during servo writing is lowered at plural frequencies in the integer multiples of a rotating frequency of the recording disk.

9. The method for writing patterns of sectors according to claim 8, wherein the rotating frequency of the recording disk is a fundamental frequency.

10. The method for writing patterns of sectors according to claim 1, wherein the set of coefficients is calculated by repetition of computing in units of a predetermined number of tracks and then the calculated set of coefficients is used to execute servo control correction during subsequent pattern writing.

11. A data storage device for writing patterns of tracks onto a recording disk, said data storage device comprising:

said recording disk that rotates;

a read element which uses servo control to follow a first track previously written onto said recording disk, the first track including patterns of plural sectors;

a write element different from said read element in terms of radial position, wherein said write element writes the patterns of the tracks onto a second track different from the first track with each sector of the first track as a reference; and a controller which calculates correction data by conducting multiply and add operations between position errors from a target position of said read element that are associated with each sector during the writing of the first track, and a set of coefficients pre-registered to suppress propagation amplification levels of track position errors due to servo writing at a selected frequency of a servo loop, wherein said controller, after calculating the correction data, positions said read element on each sector of the first track by conducting servo control corrected using the correction data.

12. The data storage device according to claim 11, wherein the set of coefficients is set such that the propagation amplification of track position errors during servo writing become less than 1 at all frequencies in the integer multiples of a rotating frequency of said recording disk.

13. The data storage device according to claim 12, wherein the set of coefficients is set such that the propagation amplification levels of track position errors during servo writing become less than 1 at plural frequencies in the integer multiples of a rotating frequency of the recording disk.

14. The data storage device according to claim 12, wherein, before the first track is followed, said controller previously calculates and registers the set of coefficients by conducting arithmetic operations equivalent to a matrix product between a Fourier inverse transform, a correction gain matrix, and a Fourier transform.

15. The data storage device according to claim 11, wherein said controller conducts servo control corrections by correcting target positions associated with each sector of the first track by use of calculated correction data.

16. The data storage device according to claim 15, wherein said controller has an FIR filter and generates the correction data with respect to each sector by using the set of coefficients as tap weights of the FIR filter and receiving the position errors of the first track that are sequentially input.

17. The data storage device according to claim 16, wherein the tap weights are the same for all sectors of the first track.

18. The data storage device according to claim 11, wherein said controller calculates the correction data for each sector of the first track by conducting multiply and add operations between any position errors of consecutive plural sectors inclusive of the sector and fewer than the total number of sectors of the first track, and the set of coefficients.

19. The data storage device according to claim 18, wherein said controller calculates the correction data for each sector of the first track by conducting multiply and add operations between any position errors of consecutive plural sectors inclusive of the sectors preceding and following the sector, and the set of coefficients.

* * * * *